(12) United States Patent
Su et al.

(10) Patent No.: US 7,499,031 B2
(45) Date of Patent: Mar. 3, 2009

(54) ELECTRONIC DEVICE

(75) Inventors: Wei-Min Su, Suzhou (CN); Ai-Jun Hu, Suzhou (CN)

(73) Assignee: Qisda Corporation, Taoyuan County (TW)

( * ) Notice: Subject to any disclaimer, the term of this patent is extended or adjusted under 35 U.S.C. 154(b) by 599 days.

(21) Appl. No.: 10/957,691

(22) Filed: Oct. 5, 2004

(65) Prior Publication Data

US 2005/0073502 A1 Apr. 7, 2005

(30) Foreign Application Priority Data

Oct. 7, 2003 (TW) .............................. 92127887 A

(51) Int. Cl.
*E05B 73/00* (2006.01)
*G09G 5/00* (2006.01)
(52) U.S. Cl. .................... 345/169; 345/160; 345/168; 345/172
(58) Field of Classification Search ............. 345/160, 345/168–172; 341/20–22; 400/490, 491, 400/495, 472; 200/5
See application file for complete search history.

(56) References Cited

U.S. PATENT DOCUMENTS

| | | | |
|---|---|---|---|
| 6,756,969 B2* | 6/2004 | Nuovo et al. ............. | 345/169 |
| 7,095,403 B2* | 8/2006 | Lyustin et al. ........... | 345/171 |
| 2001/0015721 A1* | 8/2001 | Byun et al. .............. | 345/169 |
| 2002/0187690 A1* | 12/2002 | Pereira et al. ............ | 439/874 |
| 2002/0198029 A1* | 12/2002 | Tenhunen et al. ........ | 455/566 |
| 2004/0051696 A1* | 3/2004 | O'Keeffe et al. ......... | 345/163 |

* cited by examiner

*Primary Examiner*—Bipin Shalwala
*Assistant Examiner*—Afroza Y Chowdhury

(57) ABSTRACT

A keypad having a first key and a second key is provided. The first key includes a first front body and a first back body. The first back body is disposed on the backside of the first front body. The edge of the first back body has a protruding portion. The terminal of the protruding portion is wider than the junction of the protruding portion and the edge of the first back body. The second key includes a second front body and a second back body. The second back body is disposed on the backside of the second front body. The edge of the second back body has an indentation corresponding to the protruding portion. The indentation exposes a part of the backside of the second front body for buckling up with the protruding potion tightly so that the first key and the second key are fastened together firmly.

20 Claims, 5 Drawing Sheets

ELECTRONIC DEVICE

This application claims the benefit of Taiwan application Serial No. 92127887, filed Oct. 7, 2003, the subject matter of which is incorporated herein by reference.

BACKGROUND OF THE INVENTION

1. Field of the Invention

The invention relates in general to an electronic device, and more particularly to an electronic device, which fastens a navi-key with a function-key tightly.

2. Description of the Related Art

With the rapid advance in science and technology, electronic devices are widely used nowadays. With the advantageous features of slimness, compactness, handiness and portability, portable electronic devices have become an indispensable appliance to modern people in their everyday lives. Portable electronic devices, such as personal digital assistant (PDA) and mobile phone, have a wide range of varieties. With an electronic device at hand, a user can make or answer a phone call, make or edit a memo, look up a dictionary or listen to the music whenever and wherever the user feels like to. The availability of electronic devices really brings about a great convenience to modern people in their everyday lives and shortens the distance between people in terms of communication.

Referring to FIG. 1A and FIG. 1B at the same time. FIG. 1A is a front view of a conventional mobile phone, while FIG. 1B is a rear view of the navi-key and the function-key in FIG. 1A. In FIG. 1A and FIG. 1B, mobile phone 10 includes a housing 11, a display panel 12 and a keypad 30, of which, the keypad 30 further includes a navi-key 13, function-keys 14~18 and a number of operation keys 19. The housing 11 has a housing's front surface 11a on which the display panel 12, the navi-key 13, function-keys 14~18 and operation keys 19 are disposed, wherein the navi-key 13 and function-keys 14~18 are inter-connected and disposed between the display panel 12 and operation keys 19. The navi-key 13 further includes a front portion 13a and a back portion 13b, wherein the back portion 13b is disposed on the backside of the front portion 13a while the edge of the back portion 13b almost shares the same cut surface with the edge of the front portion 13a. These function-keys 14~18 correspondingly include front portions 14a~18a and back portions 14b~18b, wherein these back portions 14b~18b are correspondingly disposed on the backside of these front portions 14a~18a while the edges of back portions 14b~18b almost respectively share the same cut surface with the edges of front portions 14a~18a.

As shown in FIG. 1B, the edge of the back portion 13b has a squared protruding portion 13c protruding out of the edge of the front portion 13a and indentations 13e~13h, wherein these indentations 13e~13h expose a part of the backside of the front portion 13a while indentations 13e and 13f are formed at both sides of the squared protruding portion 13c. With regard to function-keys 14~18, the edges of back portions 14b~18b respectively have protruding portions 14c~18c respectively protruding out of the edges of front portions 14a~18a. The back portion 16b of the function-key 16 has an indentation 16d and two protruding portions 16e and 16f protruding out of the edge of the front portion 16a, wherein the indentation 16d is formed between the protruding portion 16e and 16f for exposing a part of the backside of the front portion 16a.

As shown in FIG. 1C, when navi-key 13 is connected with function-keys 14~18, protruding portions 14c and 18c are respectively inserted into indentations 13g and 13h, protruding portions 15c and 16e are inserted into the indentation 13e, protruding portions 16f and 17c are inserted into the indentation 13f, the squared protruding portion 13c is inserted into the indentation 16d. It is noteworthy that the squared protruding portion 13c is merely inserted into the indentation 16d without any buckling design. That is to say, when dragged by a pulling force along the direction of the arrow 50 in FIG. 1B and the direction of the arrow 60 in FIG. 1C, the squared protruding portion 13c will be detached from the indentation 16d.

When the mobile phone 10 in FIG. 1A drops off to the ground or is hit by an external force, the back portion 13b will be extended and deformed by a colliding force. Since the squared protruding portion 13c is merely inserted into the indentation 16d, the squared protruding portion 13c will be detached from the indentation 16d when the back portion 13b is extended and deformed. Under this circumstance, the navi-key 13 will hump up or even become disconnected from the housing's front surface 11a in FIG. 1A, severely affecting the exterior of the mobile phone 10 and the operating function of the keypad 30.

SUMMARY OF THE INVENTION

It is therefore an object of the invention to provide an electronic device whose buckling design connecting a dovetail protruding portion and a dovetail indentation may not only prevent the keypad from damage but also maintain the exterior of the electronic device and the operating function of the keypad when hit by an external force.

According to an object of the invention an electronic device including a housing and a keypad is provided. The keypad, which is disposed on a surface of the housing, includes a first key and a second key. The first key includes a first front body and a first back body, wherein the first back body is disposed on the backside of the first front body. The edge of the first back body has a protruding portion protruding out of the edge of the first front body. The terminal of the protruding portion is wider than the junction of the protruding portion and the edge of the first back body. The second key includes a second front body and a second back body, wherein the second back body is disposed on the backside of the second front body. The edge of the second back body has an indentation corresponding to the protruding portion. The first indentation exposes a part of the backside of the second front body for buckling up with the first protruding potion tightly so that the first key and the second key are fastened together firmly.

According to another object of the invention a keypad disposed on a surface of the housing of an electronic device is provided. The keypad includes a first key and a second key. The first key includes a first front body and a first back body, wherein the first back body is disposed on the backside of the first front body. The edge of the first back body has a protruding portion protruding out of the edge of the first front body. The terminal of the protruding portion is wider than the junction of the protruding portion and the edge of the first back body. The second key includes a second front body and a second back body, wherein the second back body is disposed on the backside of the second front body. The edge of the second back body has an indentation corresponding to the protruding portion. The first indentation exposes a part of the backside of the second front body for buckling up with the first protruding potion tightly so that the first key and the second key are fastened together firmly.

Other objects, features, and advantages of the invention will become apparent from the following detailed description

DETAILED DESCRIPTION OF THE INVENTION

Figure 1A:
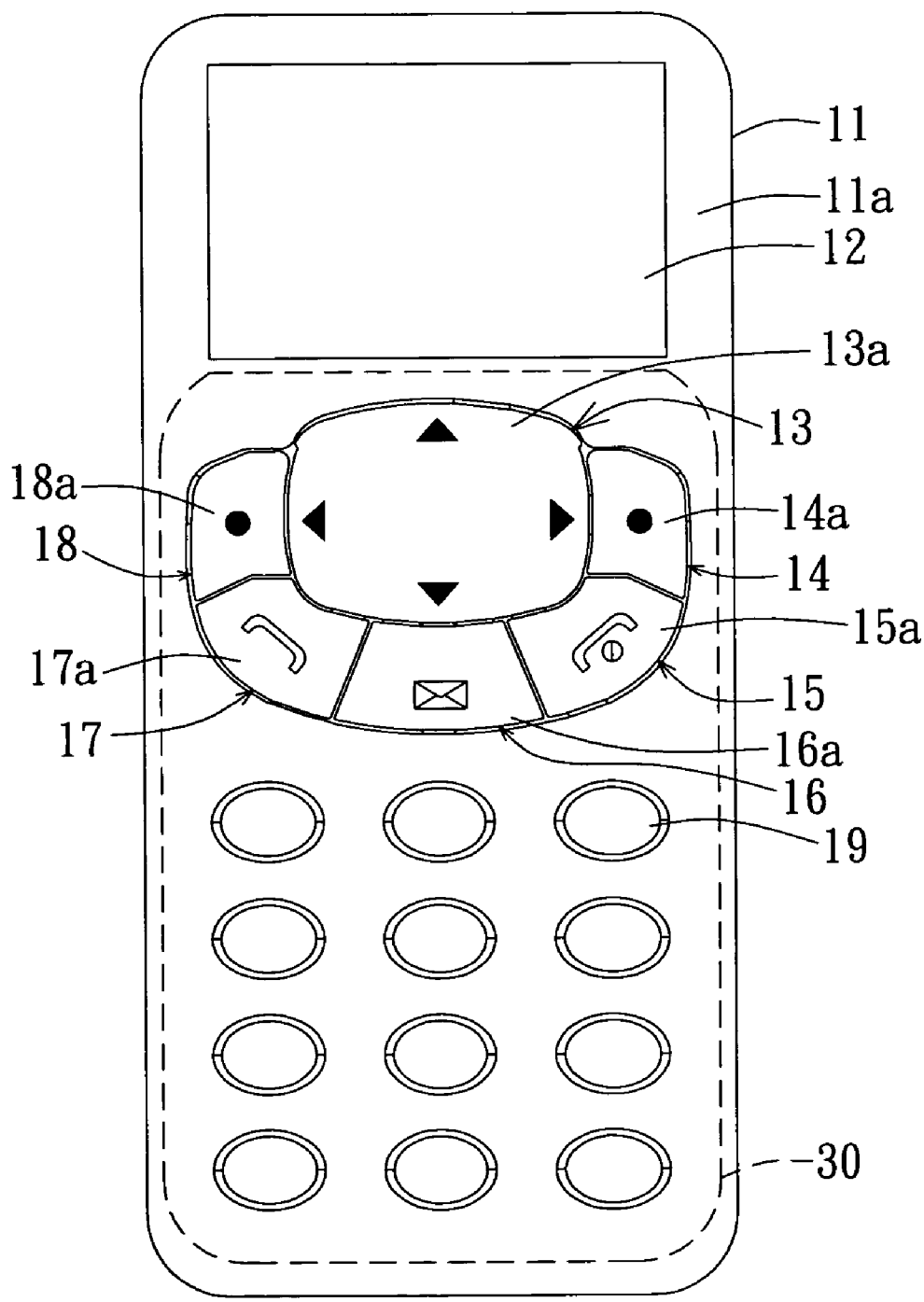
FIG. 1A(Prior Art) is a front view of a conventional mobile phone.
Figures 1B, 1C:
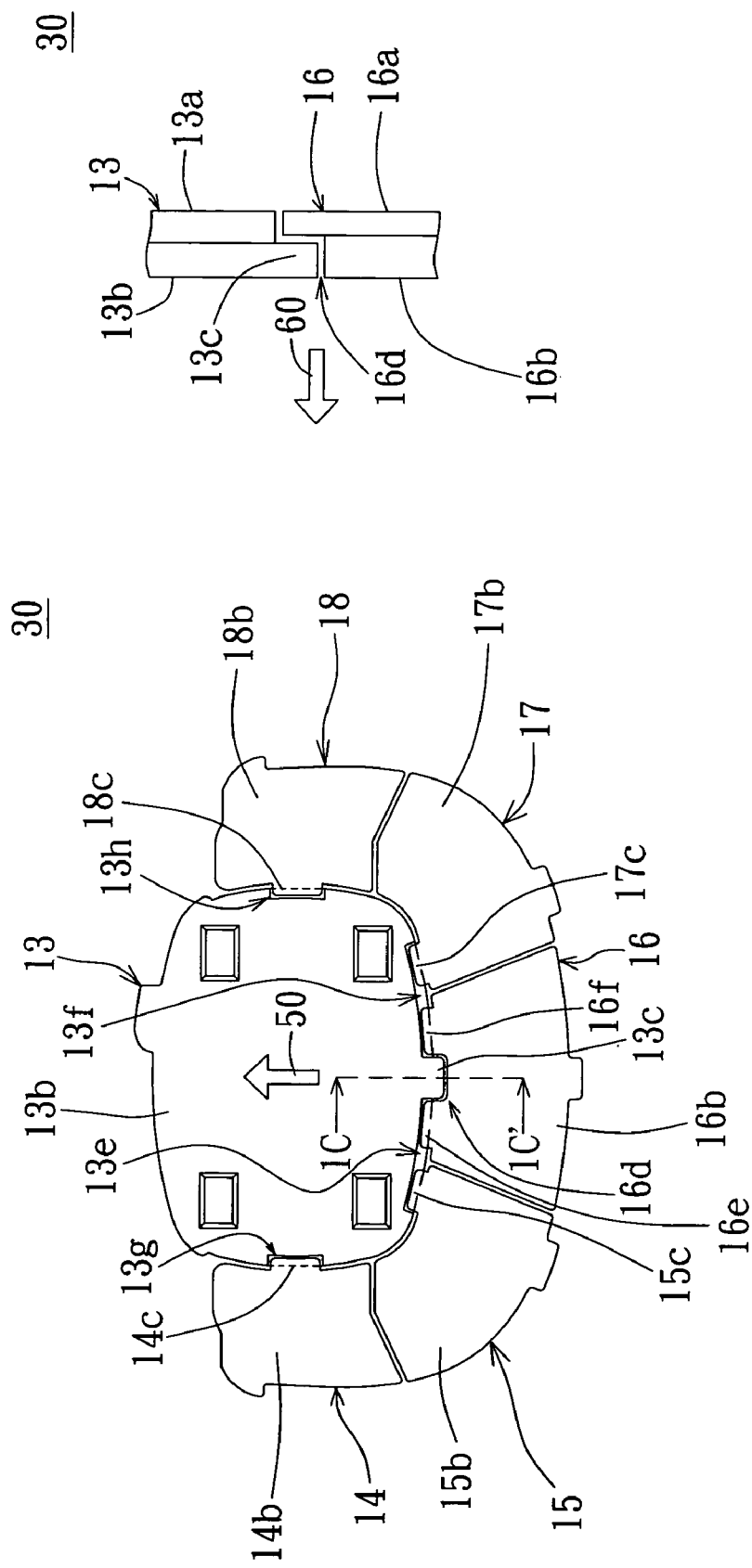
FIG. 1B(Prior Art) is a rear view of the navi-key and the function-key in FIG. 1A.
FIG. 1C(Prior Art) is a partial cross-sectional view of the navi-key and function-key along the cross-sectional line 1C-1C' in FIG. 1B.
Figure 2A:
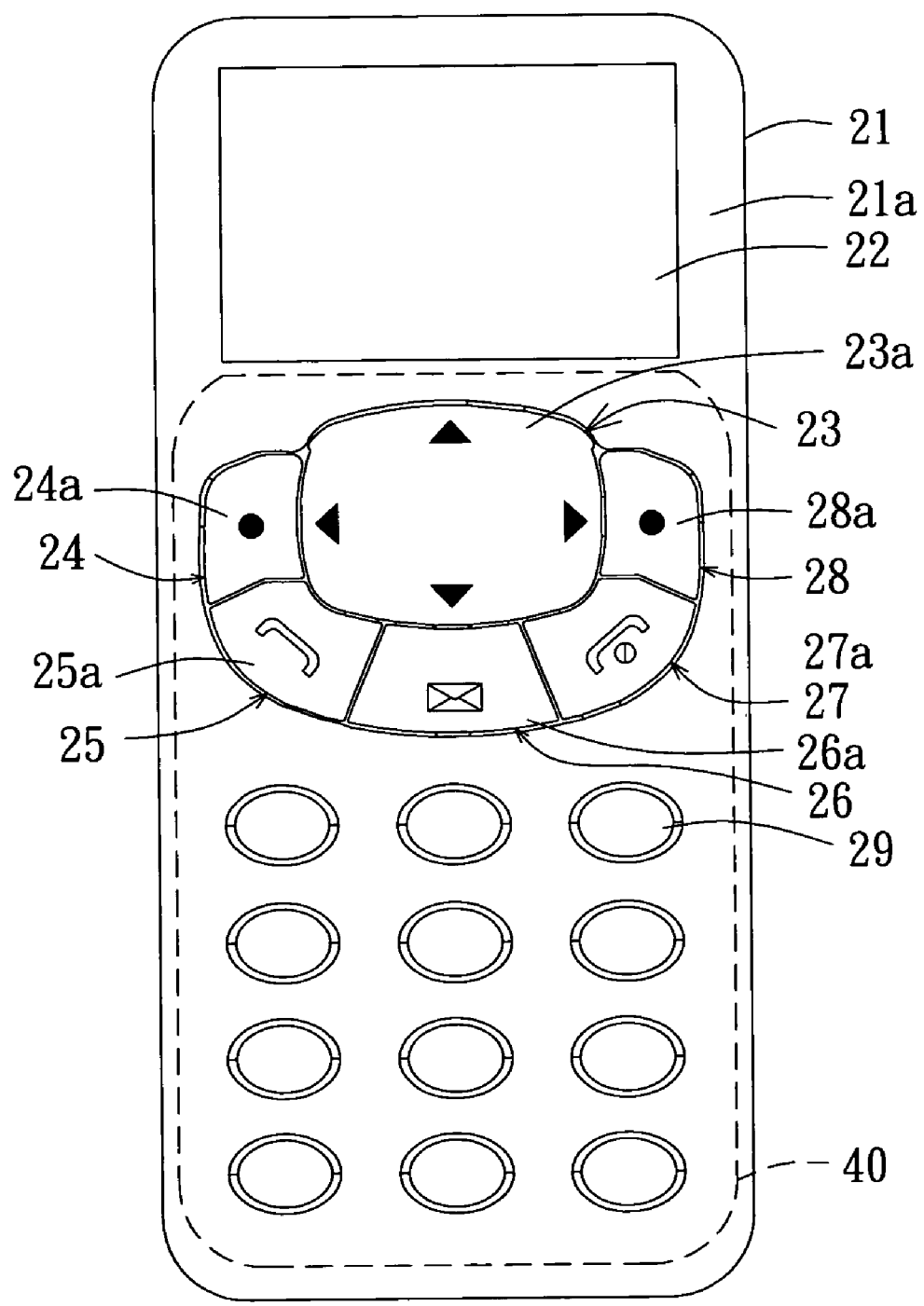
FIG. 2A is a front view of a mobile phone according to preferred embodiment one of the invention.
Figure 2C:
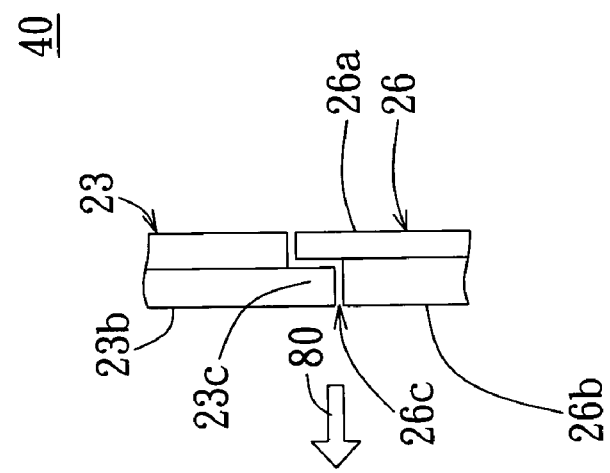
FIG. 2C is a partial cross-sectional view of the navi-key and function-key along the cross-sectional line 2C-2C' in FIG. 2B.
Figure 2B:
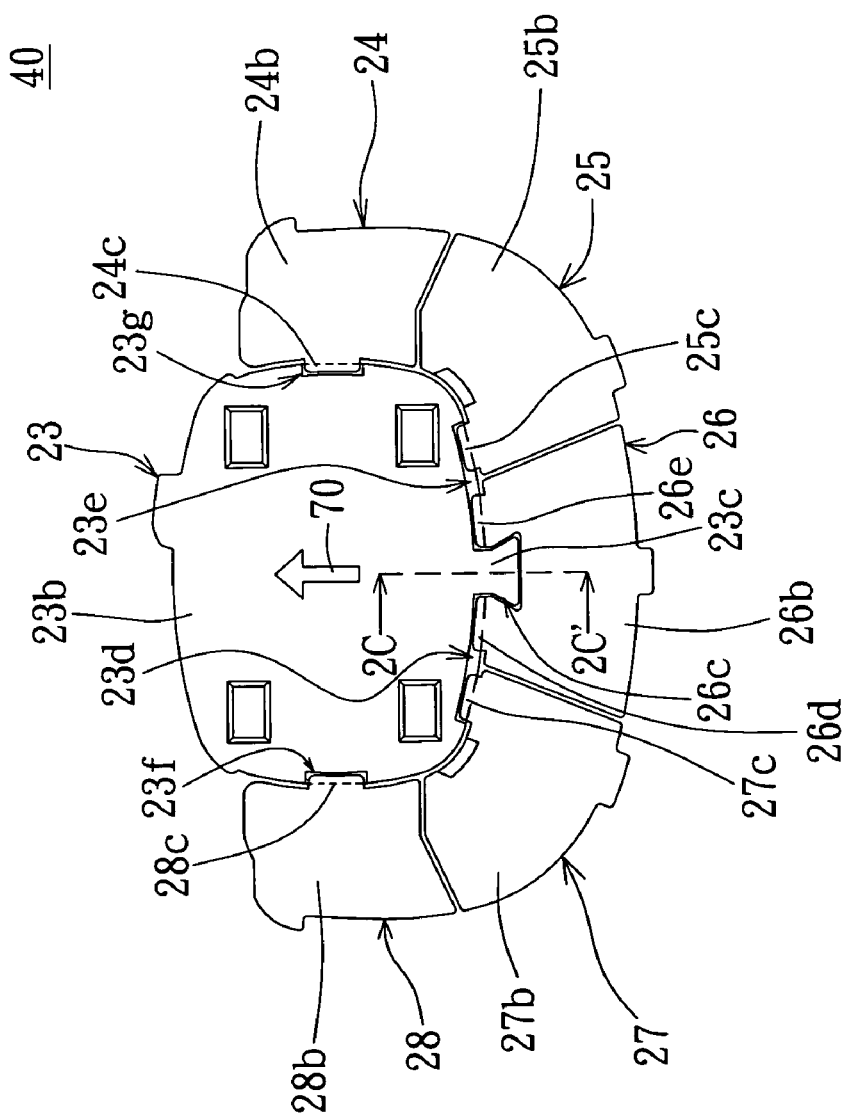
FIG. 2B is a rear view of the first key and the second keys in FIG. 2A.

PREFERRED EMBODIMENT ONE:

Referring to FIG. 2A and FIG. 2B at the same time. FIG. 2A is a front view of a mobile phone according to preferred embodiment one of the invention, while FIG. 2B is a rear view of the first key and the second keys in FIG. 2A. In FIG. 2A, electronic device 20 includes a housing 21, a display panel 22 and a keypad 40, wherein the keypad 40 further includes a first key 23, second keys 24~28, and a number of operation keys 29. In the present preferred embodiment, the first key 23 may be a navi-key while second keys 24~28 may be function-keys for instance. The housing 21 has a housing's front surface 21a on which the display panel 22, the first key 23, these second keys 24~28 and these operation keys 29 are disposed, wherein the first key 23 and these second keys 24~28 are inter-connected and disposed between the display panel 22 and these operation keys 29.

The first key 23 further includes a first front body 23a and a first back body 23b, wherein the first back body 23b is disposed on the backside of the first front body 23a. The edge of the first back body 23b has a dovetail protruding portion 23c protruding out of the edge of the first front body 23a and a number of indentations 23d~23g, wherein these indentations 23d~23g expose a part of the backside of the first front body 23a. The terminal of the dovetail protruding portion 23c is wider than the junction of the dovetail protruding portion 23c and the edge of the first back body 23b. The two indentations 23d and 23e are formed at both sides of the dovetail protruding portion 23c. These second keys 24~28 correspondingly include second front bodies 24a~28a and second back bodies 24b~28b, wherein these second back bodies 24b~28b are correspondingly disposed on the backside of these second front bodies 24a~28a. The edges of second back body 24b~28b respectively have a number of protruding portions 24c~28c, wherein these protruding portions 24c~28c respectively protruding out of the edges of these second front bodies 24a~28a. The second back body 26b has a dovetail indentation 26c corresponding to the dovetail protruding portion 23c and two protruding portions 26d and 26e protruding out of the second front body 26a. The dovetail indentation 26c, which is formed between protruding portions 26d and 26e, exposes a part of the backside of the second front body 26a.

As shown in FIG. 2C, when the first key 23 is inter-connected with these second keys 24~28, the two protruding portions 24c and 28c are respectively inserted into indentations 23g and 23f, the two protruding portions 27c and 26d are inserted into the indentation 23d, the two protruding portions 26e and 25c are inserted into the indentation 23e, the dovetail protruding portion 23c buckles up with the dovetail indentation 26c. With a dovetail buckling design, the dovetail protruding portion 23c buckles up with the dovetail indentation 26c so that the first key 23 and the second key 26 are fastened together tightly for preventing the dovetail protruding portion 23c from being detached from the dovetail indentation 26c along the direction of arrow 70 in FIG. 2B and enabling the first key 23 and the second keys 26 to be fastened together firmly. Moreover, the dovetail protruding portion 23c can only buckle up with or detach from the dovetail indentation 26c along the direction of arrow 80 in FIG. 2C.

When the electronic device 20 drops off to the ground or is hit by an external force, despite the first back body 23b will be extended and deformed by a colliding force, with the dovetail buckling design connecting the dovetail protruding portion 23c and the dovetail indentation 26c, the first key 23 will not be disconnected from the second key 26 even when the first back body 23b is extended and deformed, preventing the first key 23 from humping up or being disconnected from the housing's front surface 21a in FIG. 2A. Thus the buckling design connecting the dovetail protruding portion 23c and the dovetail indentation 26c not only prevents the first key 23 from being damaged when hit by an external force, but also maintains the exterior of the electronic device 20 and the operating function of the keypad 40.

Figure 3:
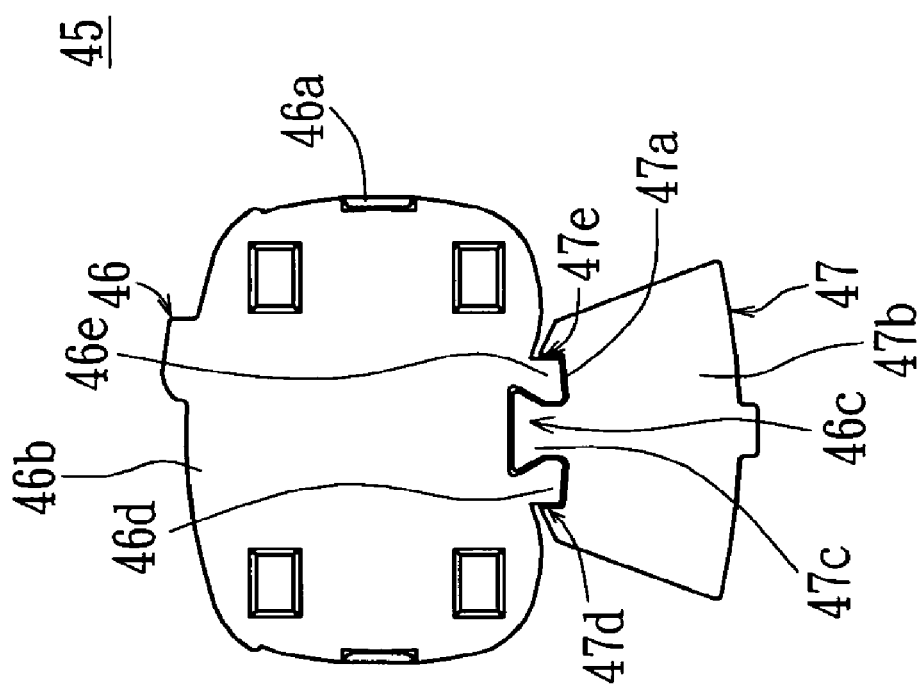
FIG. 3 is a rear view of a keypad according to preferred embodiment two of the invention.

PREFERRED EMBODIMENT TWO:

Referring to FIG. 3, a rear view of a keypad according to preferred embodiment two of the invention. In FIG. 3, keypad 45, which may be disposed on a surface of a housing of an electronic device, includes at least a first key 46 and a second key, wherein the first key 46 may be a navi-key while the second key 47 may be a function-key for instance. The first key 46 includes a first front body 46a and a first back body 46b, while the second key 47 includes a second front body 47a and a second back body 47b.

The first back body 46b has a dovetail indentation portion 46c and two protruding portions 46d and 46e protruding out of the edge of the first front body 46a, wherein the dovetail indentation portion 46c is formed between protruding portions 46d and 46e which expose a part of the backside of the first front body 46a. The edge of the second back body 47b has a dovetail protruding portion 47c protruding out of the edge of the second front body 47a and two indentations 47d and 47e. The terminal of the dovetail protruding portion 47c is wider than the junction of the dovetail protruding portion 47c and the edge of the second back body 47b. Indentations 47d and 47e, which are formed at both sides of the dovetail protruding portion 47c, expose a part of the backside of the second front body 47a. Similarly, when the first key 46 is connected with the second key 47, the dovetail protruding portion 47c buckles with the dovetail indentation 46c while these protruding portions 46d and 46e are respectively inserted into these indentations 47d and 47e so as to enable the first key 46 and the second key 47 to be fastened together firmly, thereby preventing the first key 46 from being damaged when hit by an external force and maintaining the operating function of the keypad 45. As shown in FIG. 3, both of the dovetail indentation 46c and the dovetail protruding portion 47c may be in a trapezoidal shape, thereby forming trapezoid-like structures.

It is noteworthy that despite the invention uses a dovetail protruding portion as an example, protruding portions of other shapes and the corresponding indentations thereof may also enable the first key and the second key to be fastened together firmly under the circumstance that the terminal of the protruding portion is wider than the junction of the protruding portion and the edge of the back body.

Anyone who is familiar with the technology of the invention will understand that the technology of the invention is not limited thereto. For example, the electronic device may be a portable electronic device such as a personal digital assistant or a mobile phone. Of which, the keypad according to the invention may be disposed on any surface of the housing of the electronic device. Moreover, the first front body and the second front body are formed of plastics by using all-in-one-block molding method. After performing the treatment of spray coating, laser etching, electroplating or printing on the exterior of the first front body and that of the second front body, corresponding function patterns will be formed thereon. Besides, the first front body and the second front body, if formed of rubber using all-in-one-block molding method, will have the characteristics of suppleness, flexibility and photo diffusion. Furthermore, the above disclosed first front body and the first back body as well as the second front body and the second back body may be formed by using all-in-one-block molding method, dual material injection molding method or any other appropriate methods.

The electronic device disclosed in the above disclosed preferred embodiments according to the invention, with a buckling design connecting a dovetail protruding portion and a dovetail indentation, not only prevents the keypad from damages due to the collision of an external force, but also maintains the exterior of the electronic device and the operating function of the keypad.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A keypad disposed on a surface of an electronic device, comprising:
    a first key, comprising:
        a first front body; and
        a first back body disposed on the backside of the first front body, wherein the edge of the first back body has a first protruding portion protruding out of the edge of the first front body with the terminal of the first protruding portion being wider than the junction of the first protruding portion and the edge of the first back body; and
    a second key, comprising:
        a second front body; and
        a second back body disposed on the backside of the second front body, wherein the edge of the second back body has a first indentation corresponding to the first protruding portion, a base of the first indentation is wider than an opening of the first indentation, the shape of the first indentation and the shape of the first protruding potion are similar, the first indentation exposes a part of the backside of the second front body, the first protruding potion and the first indentation are trapezoid-like structures, the length of the first protruding potion is substantially equal to the depth of the first indentation, the terminal of the first protruding potion is wider than the opening of the first indentation, and the first protruding portion is surrounded by the first indentation and fully contacts with the edge of the first indentation when the first protruding potion and the first indentation are buckled up with each other tightly so that the first key and the second key are fastened together firmly.

2. The keypad according to claim 1, wherein the edge of the first back body has two second indentations, which are formed at both sides of the first protruding portion and expose a part of the backside of the first front body.

3. The keypad according to claim 2, wherein the edge of the second back body further comprises two second protruding portions protruding out of the edge of the second front body while the first indentation is formed between the two second protruding portions, wherein the two second protruding portions are used for inserting into the two second indentations correspondingly.

4. The keypad according to claim 1, wherein the first front body and the first back body are formed by using all-in-one-block molding method, wherein the second front body and the second back body are formed by using all-in-one-block molding method.

5. The keypad according to claim 1, wherein the shape of the first protruding portion is like a dovetail.

6. The keypad according to claim 1, wherein the first front body and the first back body form the first key by using a dual material injection molding method.

7. The keypad according to claim 1, wherein the second front body and the second back body form the second key by using a dual material injection molding method.

8. An electronic device, comprising:
    a housing; and
    a keypad disposed on a surface of the housing, comprising
        a first key, comprising:
            a first front body; and
            a first back body disposed on the backside of the first front body, wherein the edge of the first back body has a first protruding portion protruding out of the edge of the first front body with the terminal of the first protruding portion being wider than the junction of the first protruding portion and the edge of the first back body; and
        a second key, comprising:
            a second front body; and
            a second back body disposed on the backside of the second front body, wherein the edge of the second back body has a first indentation corresponding to the first protruding portion, a base of the first indentation is wider than an opening of the first indentation, the shape of the first indentation and the shape of the first protruding potion are similar, the first indentation exposes a part of the backside of the second front body, the first protruding potion and the first indentation are trapezoid-like structures, the length of the first protruding potion is substantially equal to the death of the first indentation, the terminal of the first protruding potion is wider than the opening of the first indentation, and the first protruding portion is surrounded by the first indentation and fully contacts with the edge of the first indentation when the first protruding potion and the first indentation are buckled up with each other tightly so that the first key and the second key are fastened together firmly.

9. The electronic device according to claim 8, wherein the edge of the first back body has two second indentations, which are formed at both sides of the first protruding portion and expose a part of the backside of the first front body.

10. The electronic device according to claim 9, wherein the edge of the second back body further comprises two second protruding portions protruding out of the edge of the second front body while the first indentation is formed between the two second protruding portions, wherein the two second protruding portions are used for inserting into the two second indentations correspondingly.

11. The electronic device according to claim 8, wherein the shape of the first protruding portion is like a dovetail.

12. The electronic device according to claim 8, wherein the first key is a navi-key.

13. The electronic device according to claim 12, wherein the second key is a function-key.

14. The electronic device according to claim 8, wherein the first key is a function-key.

15. The electronic device according to claim 14, wherein the second key is a navi-key.

16. The electronic device according to claim 8, wherein the electronic device is a portable electronic device.

17. The electronic device according to claim 8, wherein the first front body and the first back body form the first key by using a dual material injection molding method.

18. The electronic device according to claim 8, wherein the first front body and the first back body form the first key by using all-in-one-block molding method.

19. The electronic device according to claim 8, wherein the second front body and the second back body form the second key using a dual material injection molding method.

20. The electronic device according to claim 8, wherein the first front body and the first back body are formed by using all-in-one-block molding method, wherein the second front body and the second back body form the second key by using all-in-one-block molding method.

* * * * *